United States Patent
Sodagar (10) Patent No.: US 11,012,721 B2
(45) Date of Patent: May 18, 2021

(54) METHOD AND APPARATUS FOR ENVELOPE DESCRIPTOR IN MOVING PICTURE EXPERTS GROUP NETWORK BASED MEDIA PROCESSING

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 16/813,099

(22) Filed: Mar. 9, 2020

(65) Prior Publication Data

US 2020/0296431 A1    Sep. 17, 2020

Related U.S. Application Data

(60) Provisional application No. 62/819,451, filed on Mar. 15, 2019.

(51) Int. Cl.
*H04N 21/234*  (2011.01)
*H04N 21/647*  (2011.01)
*H04N 21/44*  (2011.01)

(52) U.S. Cl.
CPC .......... *H04N 21/234* (2013.01); *H04N 21/44* (2013.01); *H04N 21/64784* (2013.01)

(58) Field of Classification Search
CPC . H04N 21/234; H04N 21/64784; H04N 21/44
See application file for complete search history.

(56) References Cited

U.S. PATENT DOCUMENTS

| | | | |
|---|---|---|---|
| 2001/0028364 A1 | 10/2001 | Fredell et al. | |
| 2005/0094729 A1 | 5/2005 | Yuan et al. | |
| 2007/0050771 A1* | 3/2007 | Howland | G06F 9/485 718/102 |
| 2010/0046842 A1 | 2/2010 | Conwell | |
| 2010/0293353 A1* | 11/2010 | Sonnier | H04L 49/101 711/170 |
| 2014/0172951 A1 | 6/2014 | Varney et al. | |
| 2014/0317631 A1* | 10/2014 | Ryshakov | G06F 9/4843 718/103 |

OTHER PUBLICATIONS

Written Opinion and International Search Report dated Jun. 16, 2020, from the International Searching Authority in International Application No. PCT/US2020/022260.

* cited by examiner

Primary Examiner — Yassin Alata
(74) Attorney, Agent, or Firm — Sughrue Mion, PLLC (57) ABSTRACT

A method of processing media content in Moving Picture Experts Group (MPEG) Network Based Media Processing (NBMP), includes obtaining multiple tasks for processing the media content, each of the multiple tasks having an envelope descriptor indicating, for a respective one among the multiple tasks, a message identifier (ID), a message priority and a sender ID of a sender, determining whether repeated tasks exist among the obtained multiple tasks, based on the message ID and the sender ID of each of the obtained multiple tasks, based on the repeated tasks being determined to exist, processing the media content, using one among the repeated tasks that has a highest priority among the message priority of each of the repeated tasks, and based on the repeated tasks being determined to not exist, processing the media content, using the obtained multiple tasks.

20 Claims, 5 Drawing Sheets

METHOD AND APPARATUS FOR ENVELOPE DESCRIPTOR IN MOVING PICTURE EXPERTS GROUP NETWORK BASED MEDIA PROCESSING

CROSS-REFERENCE TO RELATED APPLICATION

This application claims priority from U.S. Provisional Patent Application No. 62/819,451, filed on Mar. 15, 2019, in the U.S. Patent and Trademark Office, the disclosure of which is incorporated herein by reference in its entirety.

BACKGROUND

The Moving Picture Experts Group (MPEG) Network Based Media Processing (NBMP) project has developed a concept of processing media on cloud. However, current NBMP design does not provide an application program interface (API) abstraction for network management. Current NBMP design only provides APIs for cloud resources such as a hardware platform.

Further, current NBMP design does not include a common way of packaging messages passed through the APIs. Accordingly, processing messages may not go through the APIs effectively. For example, in a deployment of a workflow, several tasks may be run over multiple media processing entities. A workflow manger and the tasks may communicate through task APIs by dispatching/inquiring a group of descriptors. In large deployments, especially in high-scale ones, a number of dispatches/inquiries during a media session might be in the order of thousands or millions. Multiple messages or inquiries might occur that convey the same information. An order of these messages, their source and intended receipts among other information may be important for efficiently and effectively processing the messages.

SUMMARY

According to embodiments, a method of processing media content in Moving Picture Experts Group (MPEG) Network Based Media Processing (NBMP) is performed by at least one processor, and includes obtaining multiple tasks for processing the media content, each of the multiple tasks having an envelope descriptor indicating, for a respective one among the multiple tasks, a message identifier (ID), a message priority and a sender ID of a sender. The method further includes determining whether repeated tasks exist among the obtained multiple tasks, based on the message ID and the sender ID of each of the obtained multiple tasks, based on the repeated tasks being determined to exist, processing the media content, using one among the repeated tasks that has a highest priority among the message priority of each of the repeated tasks, and based on the repeated tasks being determined to not exist, processing the media content, using the obtained multiple tasks.

According to embodiments, an apparatus for processing media content in Moving Picture Experts Group (MPEG) Network Based Media Processing (NBMP) includes at least one memory configured to store program code, and at least one processor configured to read the program code and operate as instructed by the program code. The program code includes obtaining code configured to cause the at least one processor to obtain multiple tasks for processing the media content, each of the multiple tasks having an envelope descriptor indicating, for a respective one among the multiple tasks, a message identifier (ID), a message priority and a sender ID of a sender, and determining code configured to cause the at least one processor to determine whether repeated tasks exist among the obtained multiple tasks, based on the message ID and the sender ID of each of the obtained multiple tasks. The program code further includes processing code configured to cause the at least one processor to, based on the repeated tasks being determined to exist, process the media content, using one among the repeated tasks that has a highest priority among the message priority of each of the repeated tasks, and based on the repeated tasks being determined to not exist, process the media content, using the obtained multiple tasks.

According to embodiments, a non-transitory computer-readable medium stores instructions that, when executed by at least one processor of an apparatus for processing media content in Moving Picture Experts Group (MPEG) Network Based Media Processing (NBMP), cause the at least one processor to obtain multiple tasks for processing the media content, each of the multiple tasks having an envelope descriptor indicating, for a respective one among the multiple tasks, a message identifier (ID), a message priority and a sender ID of a sender. The instructions further cause the at least one processor to determine whether repeated tasks exist among the obtained multiple tasks, based on the message ID and the sender ID of each of the obtained multiple tasks, based on the repeated tasks being determined to exist, process the media content, using one among the repeated tasks that has a highest priority among the message priority of each of the repeated tasks, and based on the repeated tasks being determined to not exist, process the media content, using the obtained multiple tasks.

DETAILED DESCRIPTION

Embodiments described herein provide an envelope descriptor in the MPEG NBMP standard. The envelope descriptor is added to all requests that are communicated through an NBMP task API. Such an envelope descriptor increases media processing efficiency, increases speed and lower cost of deployment of media services, and allows large scale deployment of media services by leveraging public, private or hybrid cloud services.

Figure 1:
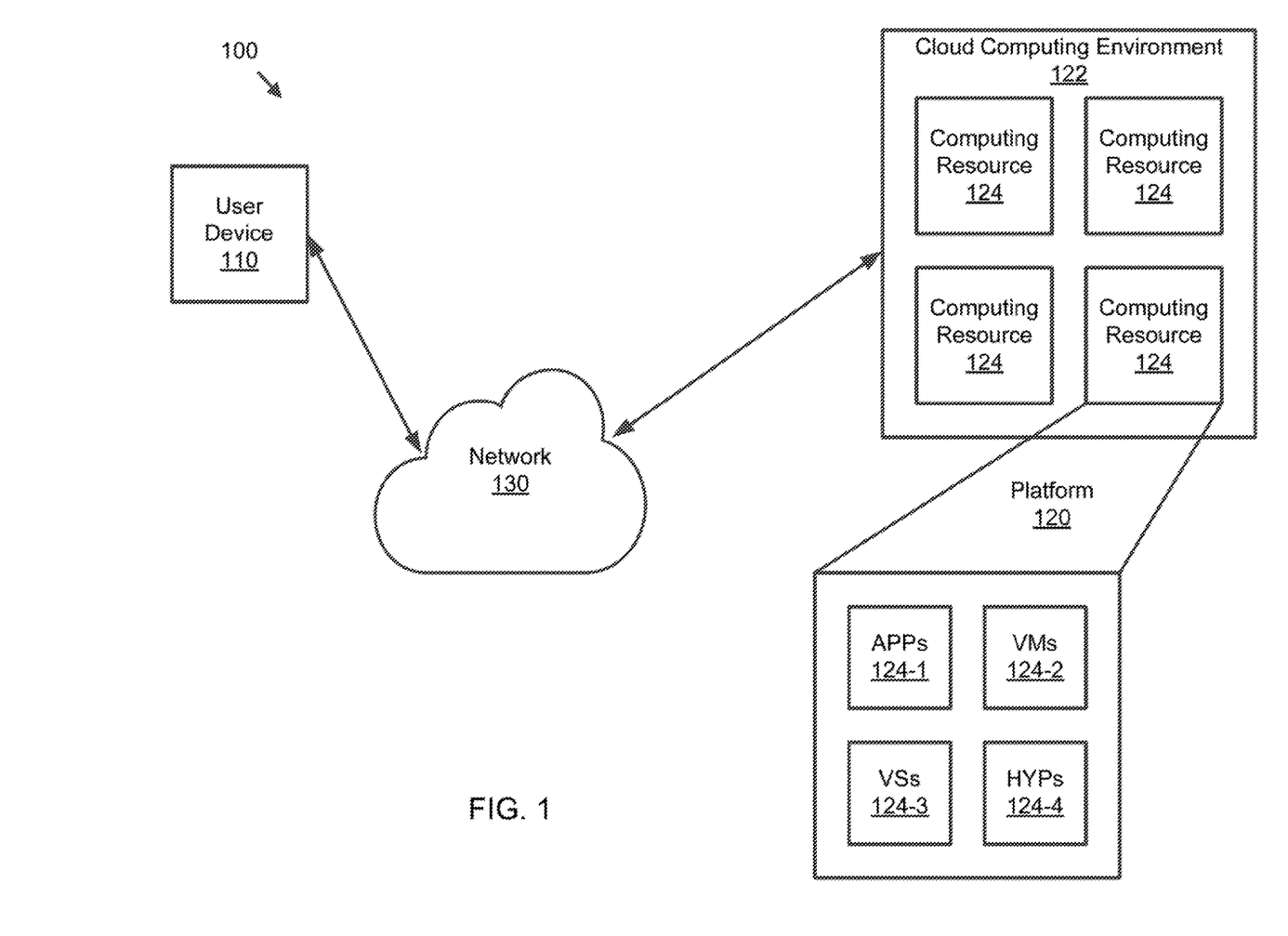
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
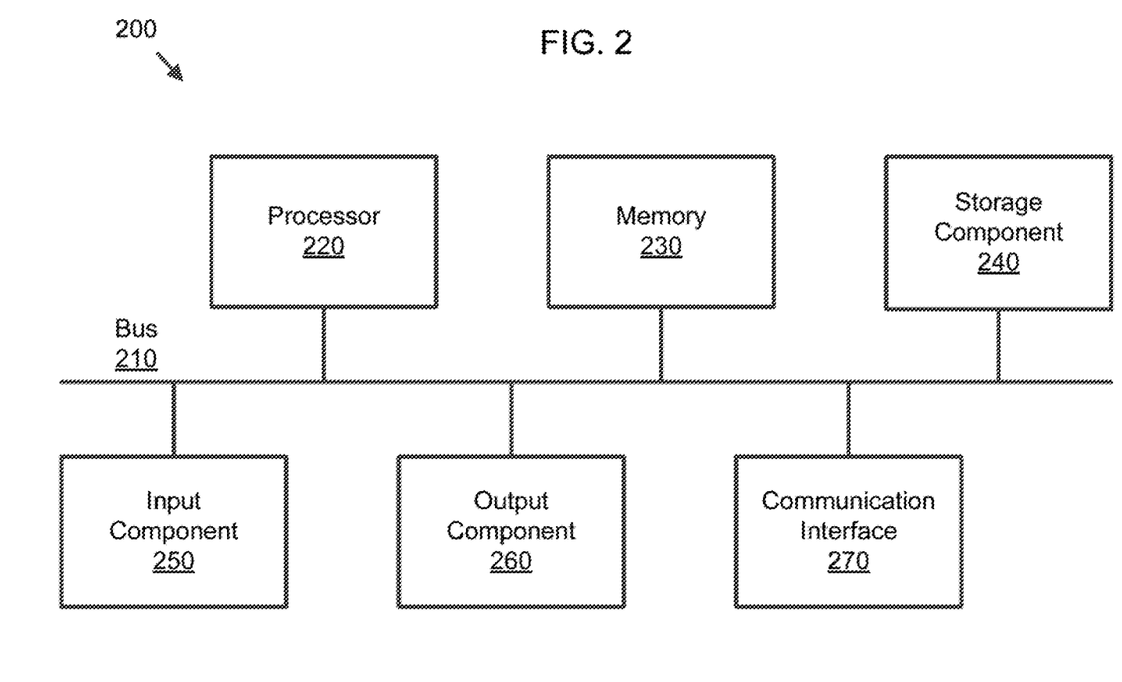
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

Figure 3:
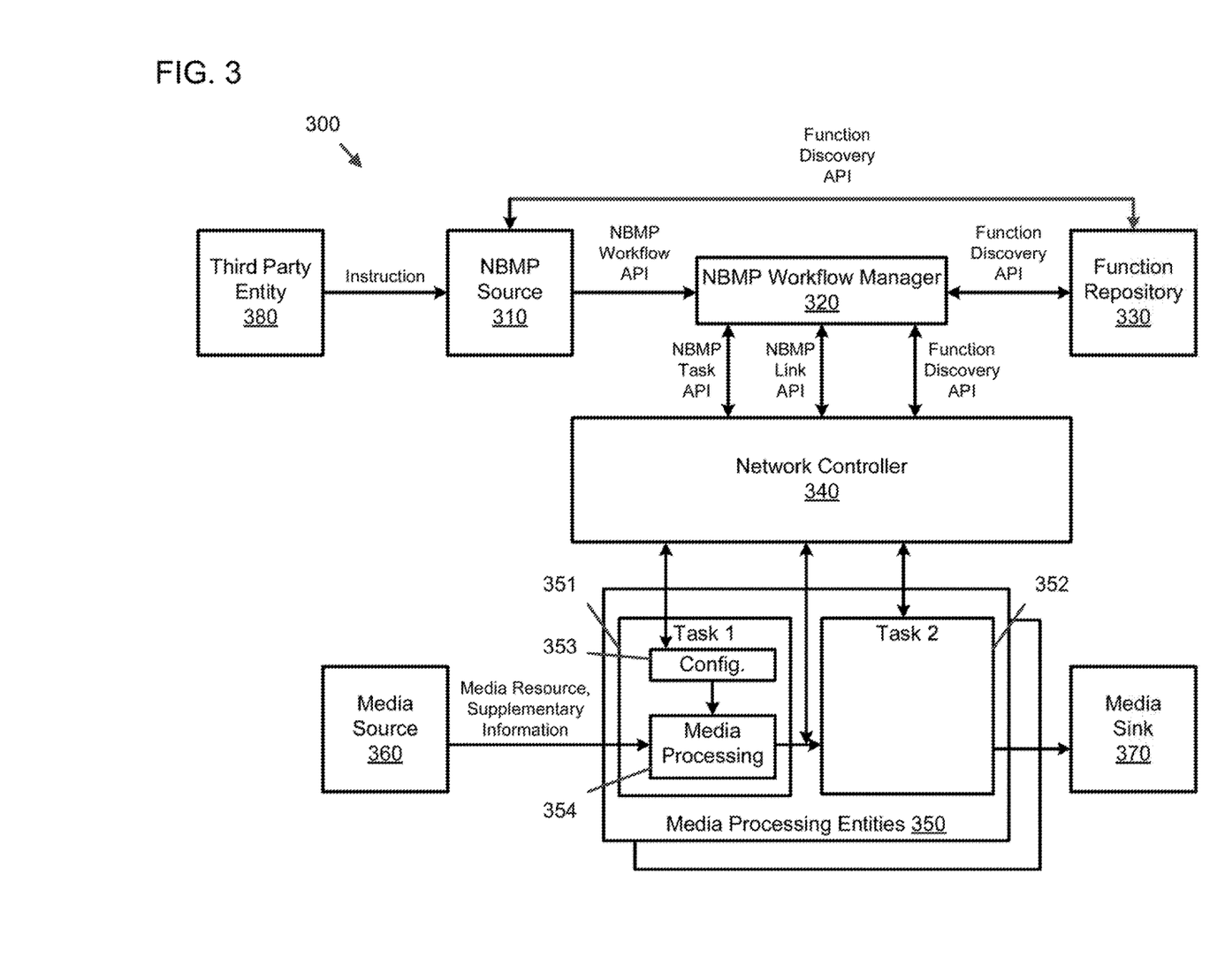
FIG. 3 is a block diagram of an NBMP system, according to embodiments.

FIG. 3 is a block diagram of an NBMP system 300, according to embodiments.

Referring to FIG. 3, the NBMP system 300 includes an NBMP source 310, an NBMP workflow manager 320, a function repository 330, a network controller 340, one or more media processing entities 350, a media source 360, and a media sink 370.

The NBMP source 310 may receive instructions from a third party entity 380, may communicate with the NBMP workflow manager 320 via an NBMP workflow API, and may communicate with the function repository 330 via a function discovery API. For example, the NBMP source 310 may send a workflow description document to the NBMP workflow manager 320, and may read a function description of functions that are stored in a memory of the function repository 330. The functions may include media processing functions such as, for example, functions of media decoding, feature point extraction, camera parameter extraction, projection method, seam information extraction, blending, post-processing, and encoding. The NBMP source 310 may include at least one processor and a memory that stores code configured to cause the at least processor to perform functions of the NBMP source 310.

The NBMP source 310 may request the NBMP workflow manager 320 to create workflow including tasks 351 and 352 to be performed by the one or more media processing entities 350, by sending the workflow description document to the NBMP workflow manager 320. The workflow description document may include descriptors, each of which may include parameters.

For example, the NBMP source 310 may select one or more of the functions stored in the function repository 330, and send, to the NBMP workflow manager 320, the workflow description document including the descriptors for describing details such as input and output data, the selected one or more of the functions, and requirements for a workflow. The workflow description document may further include a set of task descriptions and a connection map of inputs and outputs of the tasks 351 and 352 to be performed by the one or more of the media processing entities 350. When the NBMP workflow manager 320 receives such information from the NBMP source 310, the NBMP workflow manager 320 may create the workflow by instantiating the tasks 351 and 352 based on function names and connecting the tasks 351 and 352 in accordance with the connection map.

Alternatively or additionally, the NBMP source 310 may request the NBMP workflow manager 320 to create a workflow by using a set of keywords. For example, the NBMP source 310 may send, to the NBMP workflow manager 320, the workflow description document including the set of the keywords that the NBMP workflow manager 320 may use to find appropriate one or more of the functions stored in the function repository 330. When the NBMP workflow manager 320 receives such information from the NBMP source 310, the NBMP workflow manager 320 may create the workflow by searching for the appropriate one or more of the functions, using the keywords that may be specified in a Processing Descriptor of the workflow description document, and by using other descriptors in the workflow description document to provision and connect the tasks 351 and 352.

The NBMP workflow manager 320 may communicate with the function repository 330 via a function discovery API, and may communicate with one or more of the media processing entities 350, through the network controller 340, via an NBMP task API, an NBMP link API, and a function discovery API. The NBMP workflow manager 320 may include at least one processor and a memory that stores code configured to cause the at least processor to perform functions of the NBMP workflow manager 320.

The NBMP workflow manager 320 may use the NBMP task API to setup, configure, manage, and monitor one or more of the tasks 351 and 352 of the workflow that is performable by the one or more media processing entities 350. In embodiments, the NBMP workflow manager 320 may use the NBMP task API to update and destroy the tasks 351 and 352. To configure, manage, and monitor the tasks 351 and 352 of the workflow, the NBMP workflow manager 320 may send messages, such as requests, to one or more of the media processing entities 350, wherein each message may have descriptors, each of which may include parameters. The tasks 351 and 352 may each include one or more media processing functions 354 and one or more configurations 353 for the one or more media processing functions 354.

In embodiments, after receiving the workflow description document from the NBMP source 310 that does not include a list of tasks (e.g., includes a list of keywords instead of a list of tasks), the NBMP workflow manager 320 may select the tasks based on descriptions of the tasks in the workflow description document, to search the function repository 330, via the function discovery API, to find appropriate one or more of the functions to run as the tasks 351 and 352 for the current workflow. For example, the NBMP workflow manager 320 may select the tasks based on keywords that are provided in the workflow description document. After the appropriate one or more of the functions are identified using the keywords or the set of task descriptions that is provided by the NBMP source 310, the NBMP workflow manager 320 may configure the selected tasks in the workflow by using the NBMP task API. For example, the NBMP workflow manager 320 may extract configuration data from information that is received from the NBMP source, and configure the tasks 351 and 352 based on the extracted configuration data.

The one or more media processing entities 350 may be configured to receive media content from the media source 360, process the received media content in accordance with the workflow that includes the tasks 351 and 352 and is created by the NBMP workflow manager 320, and output the processed media content to the media sink 370. The one or more media processing entities 350 may each include at least one processor and a memory that stores code configured to cause the at least processor to perform functions of the one or more media processing entities 350.

The network controller 340 may include at least one processor and a memory that stores code configured to cause the at least processor to perform functions of the network controller 340.

The media source 360 may include memory that stores media and may be integrated with or separate from the NBMP source 310. In embodiments, the NBMP workflow manager 320 may notify the NBMP source 310 and/or the media source 360 when a workflow is prepared, and the media source 360 may transmit media content to the one or more of the media processing entities 350 based on a notification that the workflow is prepared.

The media sink 370 may include at least one processor and at least one display that is configured to display media content that is processed by the one or more media processing entities 350.

The third party entity 380 may include at least one processor and a memory that stores code configured to cause the at least processor to perform functions of the third party entity 380.

As discussed above, messages from the NBMP source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include descriptors, each of which including parameters. In embodiments, communication between any of components of the NBMP system 300 using an API may include descriptors, each of which including parameters.

Embodiments described herein provide an envelope descriptor that is added to the NBMP task API shown in FIG. 3. Any communication through the NBMP task API carries one envelope descriptor including information that is described in Table 1:

TABLE 1

| Parameter Name | Mandatory or Optional | Description | Data Type |
|---|---|---|---|
| Message Version | Mandatory | Envelope version | Number |
| Message Identifier (ID) | Mandatory | Unique ID for a message (instance). Messages with identical message IDs are equivalent and only one may be processed. | String |
| Session ID | Mandatory | Unique ID for a session. The session is defined by a user and a scope of uniqueness shall be determined by that definition. | String |
| Message Priority | Optional | Number indicating a priority of a message. A lower number means a higher priority. | Unsigned Integer |
| Publish Time | Mandatory | Publication time of a message in a wall clock. | Network Time Protocol (NTP) Format |
| Expiration Time | Optional | An expiration time of a message in a wall clock. | NTP Format |
| Sender ID | Mandatory | Unique sender's ID. This ID shall be | String |

TABLE 1-continued

Envelope Descriptor

| Parameter Name | Mandatory or Optional | Description | Data Type |
|---|---|---|---|
| | | unique among all entities (a workflow manager and tasks) in a scope of a session. | |
| Recipients ID | Mandatory | List of unique recipients' IDs. These IDs shall be unique among all entities (a workflow manager and tasks) in a scope of a session. | String |

In Table 1, a message version indicates a version of a message and can be used for future extensions.

A message ID is used to identify one instance of a message. This is useful if the same message is sent multiple times. Recipients may only process one and ignore others.

Session ID is used to identify a session. The session is defined by a workflow description document, as it depends on a lifetime and a scope of an application. The session ID along with a Message ID define a unique ID of a message cross all sessions that are set up by a user.

A message priority indicates a priority of a message for a sender. This is a number, and a lower number means a higher priority.

A publish time indicate a wall clock time of composing a message. This can be used for ordering messages from the same sender or multiple senders in terms of processing the messages.

An expiration time indicate a wall clock time at which a message will be expired, and processing the message after the expiration time is not required.

A sender ID is a unique ID of a sender of a message, as there is one sender per one workflow.

A recipients ID is a list of unique IDs for recipients of a message.

In embodiments, the envelope descriptor may be used for any API and/or any descriptor of the NBMP system 300 shown in FIG. 3.

If additional messages are in a task, only message IDs, message priorities and sender IDS of the additional messages may be kept for use in respective envelope descriptors and by the NBMP workflow manager 320, to reduce redundancies and sizes of the envelope descriptors.

For each session, a user initially sets up parameters of an envelope descriptor. For instance, the user may assign a session ID, set up sender/recipient IDs for each task, and define a priority range for each task.

The workflow description document includes information that is described in Table 2:

TABLE 2

Envelope Descriptor Parameter included in Workflow Description Document

| Parameter Name | Mandatory or Optional | Description | Data Type |
|---|---|---|---|
| Session ID | Mandatory | Session ID that shall be used. | String |

The NBMP workflow manager 320 may use the following parameters of an envelope descriptor during each task configuration as described in Table 3:

TABLE 3

Envelope Descriptor Parameters used in Task Configuration

| Parameter Name | Mandatory or Optional | Description | Data Type |
|---|---|---|---|
| Message Version | Mandatory | Highest envelope version that is accepted by a workflow manager. | Number |
| Message ID | Optional | Message ID prefix that is assigned to a task. Every message from this task shall have this value as its prefix. A default value is no prefix. | String |
| Session ID | Mandatory | Session ID that shall be used. | String |
| Message Priority | Optional | Highest priority (lowest integer number) that may be used. A default value is 0. | Unsigned Integer |
| Sender ID | Mandatory | Workflow manager's ID. | String |
| Recipients ID | Mandatory | ID that is assigned to a task and shall be used in all messages. | String |

The NBMP workflow manager 320 may use the session ID defined in the workflow description document in the envelope descriptor.

The NBMP workflow manager 320 may use the same value of the sender ID for all tasks being created.

The above values cannot be changed during task updates.

In a use case of an envelope descriptor during a session, every API request includes one and only one envelope descriptor. The NBMP workflow manager 320 may use a sender ID and tasks IDs in these requests that are established during an initial setup.

Each task shall use a mandatory parameter and values set that is received during an initial setup for request through an API.

By using the envelope descriptor according to embodiments, the NBMP workflow manager 320 may more easily find repeated messages in a workflow and purge them except for one that is kept for processing. Further, the NBMP workflow manager 320 may more easily prioritize the messages, using a message priority parameter of the envelope descriptor. Lastly, components of the NBMP system 300 may more easily log and trace messages, workflows, tasks and functions, using the envelope descriptor.

Figure 4:
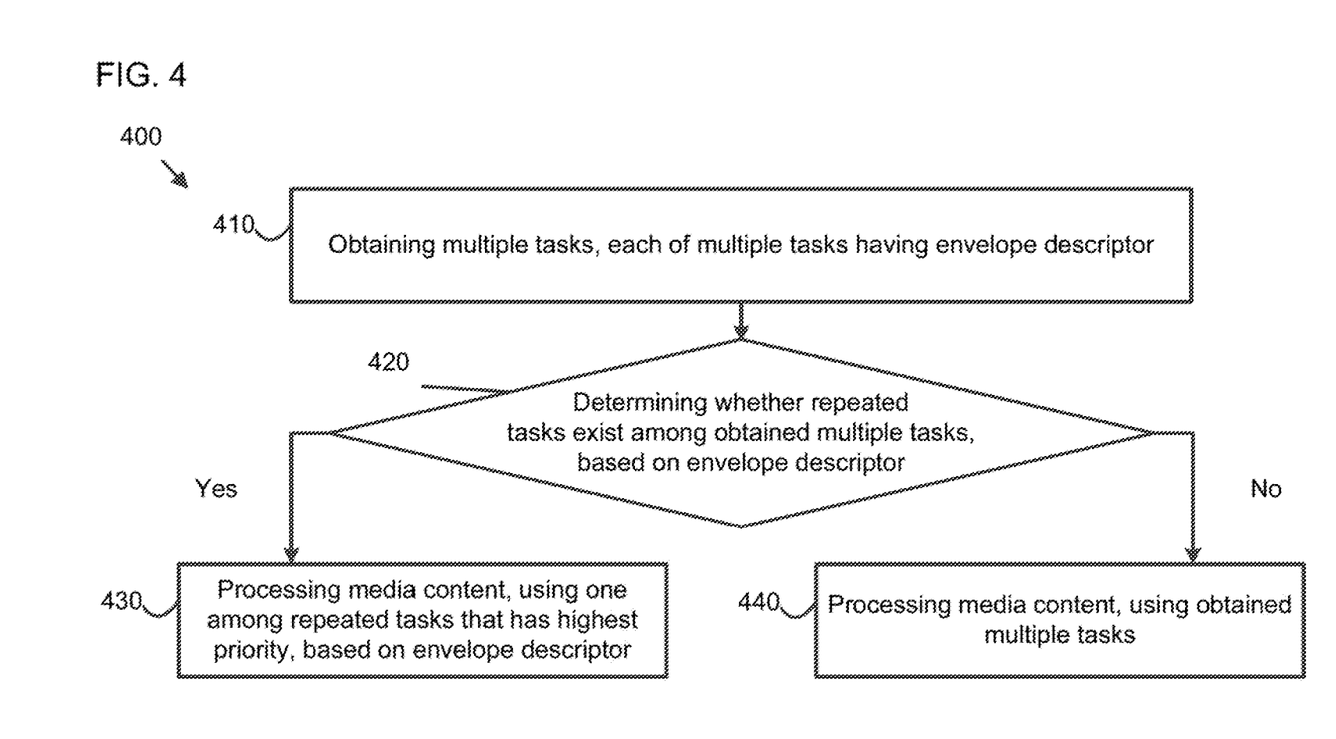
FIG. 4 is a flowchart of a method of processing media content in MPEG NBMP, according to embodiments.

FIG. 4 is a flowchart of a method 400 of processing media content in MPEG NBMP, according to embodiments. In some implementations, one or more process blocks of FIG. 4 may be performed by the platform 120 implementing the NBMP system 300. In some implementations, one or more process blocks of FIG. 4 may be performed by another device or a group of devices separate from or including the platform 120 implementing the NBMP system 300, such as the user device 110.

As shown in FIG. 4, in operation 410, the method 400 includes obtaining multiple tasks for processing the media content, each of the multiple tasks having an envelope descriptor indicating, for a respective one among the multiple tasks, a message identifier (ID), a message priority and a sender ID of a sender.

In operation 420, the method 400 includes determining whether repeated tasks exist among the obtained multiple tasks, based on the message ID and the sender ID of each of the obtained multiple tasks.

In operation 430, the method 400 includes, based on the repeated tasks being determined to exist, processing the media content, using one among the repeated tasks that has a highest priority among the message priority of each of the repeated tasks.

In operation 440, the method 400 includes, based on the repeated tasks being determined to not exist, processing the media content, using the obtained multiple tasks.

The determining whether the repeated tasks exist among the obtained multiple tasks may include determining whether the message ID of a first one among the repeated tasks is identical to the message ID of a second one among the repeated tasks, and based on the message ID of the first one among the repeated tasks being determined to be identical to the message ID of the second one among the repeated tasks, determining that the repeated tasks exist among the obtained multiple tasks.

The determining whether the repeated tasks exist among the obtained multiple tasks may include determining whether the sender ID of a first one among the repeated tasks is identical to the sender ID of a second one among the repeated tasks, and based on the sender ID of the first one among the repeated tasks being determined to be identical to the sender ID of the second one among the repeated tasks, determining that the repeated tasks exist among the obtained multiple tasks.

The method may further include, based on the repeated tasks being determined to exist, purging a remaining one among the repeated tasks from the obtained multiple tasks so that the media content is not processed using the purged remaining one among the repeated tasks.

The processing the media content, using the obtained multiple tasks, may include, based on the repeated tasks being determined to not exist, processing the media content, using the obtained multiple tasks in an order based on the message priority of each of the obtained multiple tasks.

The method may further include logging the obtained multiple tasks, using the envelope descriptor of each of the obtained multiple tasks.

The method may be performed by the media processing entity 350, and the multiple tasks may be obtained from the NBIVIP workflow manager 320.

Although FIG. 4 shows example blocks of the method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel.

Figure 5:
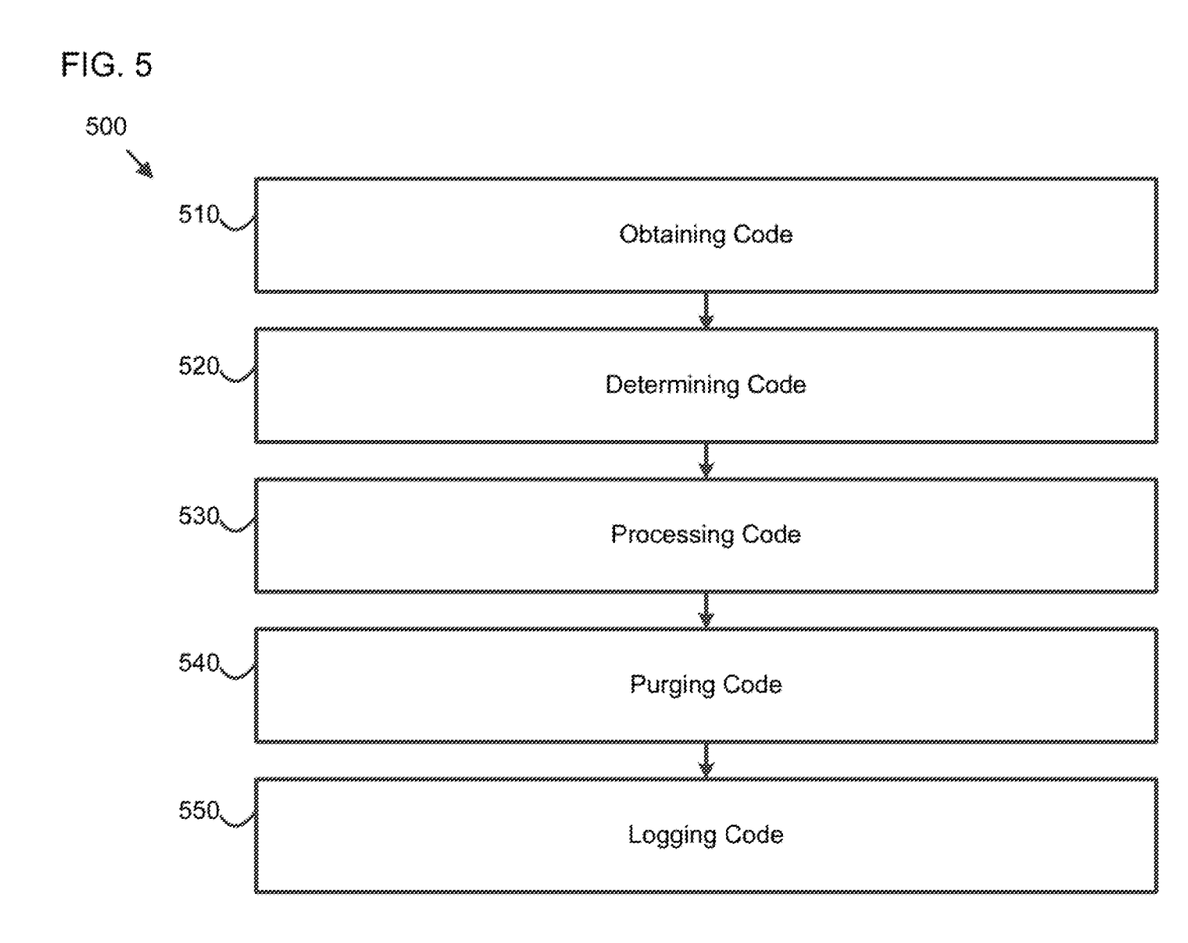
FIG. 5 is a block diagram of an apparatus for processing media content in MPEG NBMP, according to embodiments.

FIG. 5 is a diagram of an apparatus 500 for processing media content in MPEG NBMP, according to embodiments. As shown in FIG. 5, the apparatus 500 includes obtaining code 510, determining code 520, processing code 530, purging code 540 and logging code 550.

The obtaining code 510 is configured to cause the at least one processor to obtain multiple tasks for processing the media content, each of the multiple tasks having an envelope descriptor indicating, for a respective one among the multiple tasks, a message identifier (ID), a message priority and a sender ID of a sender.

The determining code 520 is configured to cause the at least one processor to determine whether repeated tasks exist among the obtained multiple tasks, based on the message ID and the sender ID of each of the obtained multiple tasks.

The processing code 530 is configured to cause the at least one processor to, based on the repeated tasks being determined to exist, process the media content, using one among the repeated tasks that has a highest priority among the message priority of each of the repeated tasks, and based on the repeated tasks being determined to not exist, process the media content, using the obtained multiple tasks.

The determining code 520 may be further configured to cause the at least one processor to determine whether the message ID of a first one among the repeated tasks is identical to the message ID of a second one among the repeated tasks, and based on the message ID of the first one among the repeated tasks being determined to be identical to the message ID of the second one among the repeated tasks, determine that the repeated tasks exist among the obtained multiple tasks.

The determining code 520 may be further configured to cause the at least one processor to determine whether the sender ID of a first one among the repeated tasks is identical to the sender ID of a second one among the repeated tasks, and based on the sender ID of the first one among the repeated tasks being determined to be identical to the sender ID of the second one among the repeated tasks, determine that the repeated tasks exist among the obtained multiple tasks.

The purging code 540 may be configured to cause the at least one processor to, based on the repeated tasks being determined to exist, purge a remaining one among the repeated tasks from the obtained multiple tasks so that the media content is not processed using the purged remaining one among the repeated tasks.

The processing code 530 may be further configured to cause the at least one processor to, based on the repeated tasks being determined to not exist, process the media content, using the obtained multiple tasks in an order based on the message priority of each of the obtained multiple tasks.

The logging code 550 may be configured to cause the at least one processor to log the obtained multiple tasks, using the envelope descriptor of each of the obtained multiple tasks.

The apparatus may be the media processing entity 350, and the multiple tasks are obtained from the NBMP workflow manager 320.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method of processing media content in Moving Picture Experts Group (MPEG) Network Based Media Processing (NBMP), the method being performed by at least one processor, and the method comprising:
   obtaining multiple tasks for processing the media content, each of the multiple tasks having an envelope descriptor indicating, for a respective one among the multiple tasks, a message identifier (ID), a message priority and a sender ID of a sender;
   determining whether repeated tasks exist among the obtained multiple tasks, based on the message ID and the sender ID of each of the obtained multiple tasks;
   based on the repeated tasks being determined to exist, processing the media content, using one among the repeated tasks that has a highest priority among the message priority of each of the repeated tasks; and
   based on the repeated tasks being determined to not exist, processing the media content, using the obtained multiple tasks.

2. The method of claim 1, wherein the determining whether the repeated tasks exist among the obtained multiple tasks comprises:
   determining whether the message ID of a first one among the repeated tasks is identical to the message ID of a second one among the repeated tasks; and
   based on the message ID of the first one among the repeated tasks being determined to be identical to the message ID of the second one among the repeated tasks, determining that the repeated tasks exist among the obtained multiple tasks.

3. The method of claim 1, wherein the determining whether the repeated tasks exist among the obtained multiple tasks comprises:
   determining whether the sender ID of a first one among the repeated tasks is identical to the sender ID of a second one among the repeated tasks; and
   based on the sender ID of the first one among the repeated tasks being determined to be identical to the sender ID of the second one among the repeated tasks, determining that the repeated tasks exist among the obtained multiple tasks.

4. The method of claim 1, further comprising, based on the repeated tasks being determined to exist, purging a remaining one among the repeated tasks from the obtained multiple tasks so that the media content is not processed using the purged remaining one among the repeated tasks.

5. The method of claim 1, wherein the processing the media content, using the obtained multiple tasks, comprises, based on the repeated tasks being determined to not exist, processing the media content, using the obtained multiple tasks in an order based on the message priority of each of the obtained multiple tasks.

6. The method of claim 1, further comprising logging the obtained multiple tasks, using the envelope descriptor of each of the obtained multiple tasks.

7. The method of claim 1, wherein the method is performed by a media processing entity, and
   the multiple tasks are obtained from an NBMP workflow manager.

8. An apparatus for processing media content in Moving Picture Experts Group (MPEG) Network Based Media Processing (NBMP), the apparatus comprising:
   at least one memory configured to store program code; and
   at least one processor configured to read the program code and operate as instructed by the program code, the program code comprising:
      obtaining code configured to cause the at least one processor to obtain multiple tasks for processing the media content, each of the multiple tasks having an envelope descriptor indicating, for a respective one among the multiple tasks, a message identifier (ID), a message priority and a sender ID of a sender;
      determining code configured to cause the at least one processor to determine whether repeated tasks exist among the obtained multiple tasks, based on the message ID and the sender ID of each of the obtained multiple tasks; and
      processing code configured to cause the at least one processor to:
         based on the repeated tasks being determined to exist, process the media content, using one among the repeated tasks that has a highest priority among the message priority of each of the repeated tasks; and
         based on the repeated tasks being determined to not exist, process the media content, using the obtained multiple tasks.

9. The apparatus of claim 8, wherein the determining code is further configured to cause the at least one processor to:
   determine whether the message ID of a first one among the repeated tasks is identical to the message ID of a second one among the repeated tasks; and
   based on the message ID of the first one among the repeated tasks being determined to be identical to the message ID of the second one among the repeated tasks, determine that the repeated tasks exist among the obtained multiple tasks.

10. The apparatus of claim 8, wherein the determining code is further configured to cause the at least one processor to:
    determine whether the sender ID of a first one among the repeated tasks is identical to the sender ID of a second one among the repeated tasks; and
    based on the sender ID of the first one among the repeated tasks being determined to be identical to the sender ID of the second one among the repeated tasks, determine that the repeated tasks exist among the obtained multiple tasks.

11. The apparatus of claim 8, further comprising purging code configured to cause the at least one processor to, based on the repeated tasks being determined to exist, purge a remaining one among the repeated tasks from the obtained multiple tasks so that the media content is not processed using the purged remaining one among the repeated tasks.

12. The apparatus of claim 8, wherein the processing code is further configured to cause the at least one processor to, based on the repeated tasks being determined to not exist, process the media content, using the obtained multiple tasks in an order based on the message priority of each of the obtained multiple tasks.

13. The apparatus of claim 8, further comprising logging code configured to cause the at least one processor to log the obtained multiple tasks, using the envelope descriptor of each of the obtained multiple tasks.

14. The apparatus of claim 8, wherein the apparatus is a media processing entity, and
the multiple tasks are obtained from an NBMP workflow manager.

15. A non-transitory computer-readable medium storing instructions that, when executed by at least one processor of an apparatus for processing media content in Moving Picture Experts Group (MPEG) Network Based Media Processing (NBMP), cause the at least one processor to:
obtain multiple tasks for processing the media content, each of the multiple tasks having an envelope descriptor indicating, for a respective one among the multiple tasks, a message identifier (ID), a message priority and a sender ID of a sender;
determine whether repeated tasks exist among the obtained multiple tasks, based on the message ID and the sender ID of each of the obtained multiple tasks;
based on the repeated tasks being determined to exist, process the media content, using one among the repeated tasks that has a highest priority among the message priority of each of the repeated tasks; and
based on the repeated tasks being determined to not exist, process the media content, using the obtained multiple tasks.

16. The non-transitory computer-readable medium of claim 15, wherein the instructions further cause the at least one processor to:
determine whether the message ID of a first one among the repeated tasks is identical to the message ID of a second one among the repeated tasks; and
based on the message ID of the first one among the repeated tasks being determined to be identical to the message ID of the second one among the repeated tasks, determine that the repeated tasks exist among the obtained multiple tasks.

17. The non-transitory computer-readable medium of claim 15, wherein the instructions further cause the at least one processor to:
determine whether the sender ID of a first one among the repeated tasks is identical to the sender ID of a second one among the repeated tasks; and
based on the sender ID of the first one among the repeated tasks being determined to be identical to the sender ID of the second one among the repeated tasks, determine that the repeated tasks exist among the obtained multiple tasks.

18. The non-transitory computer-readable medium of claim 15, wherein the instructions further cause the at least one processor to, based on the repeated tasks being determined to exist, purge a remaining one among the repeated tasks from the obtained multiple tasks so that the media content is not processed using the purged remaining one among the repeated tasks.

19. The non-transitory computer-readable medium of claim 15, wherein the instructions further cause the at least one processor to, based on the repeated tasks being determined to not exist, process the media content, using the obtained multiple tasks in an order based on the message priority of each of the obtained multiple tasks.

20. The non-transitory computer-readable medium of claim 15, wherein the instructions further cause the at least one processor to log the obtained multiple tasks, using the envelope descriptor of each of the obtained multiple tasks.

\* \* \* \* \*